July 24, 1962  A. PFENNIGHAUSEN  3,045,385
GOPHER TRAP
Filed March 24, 1960
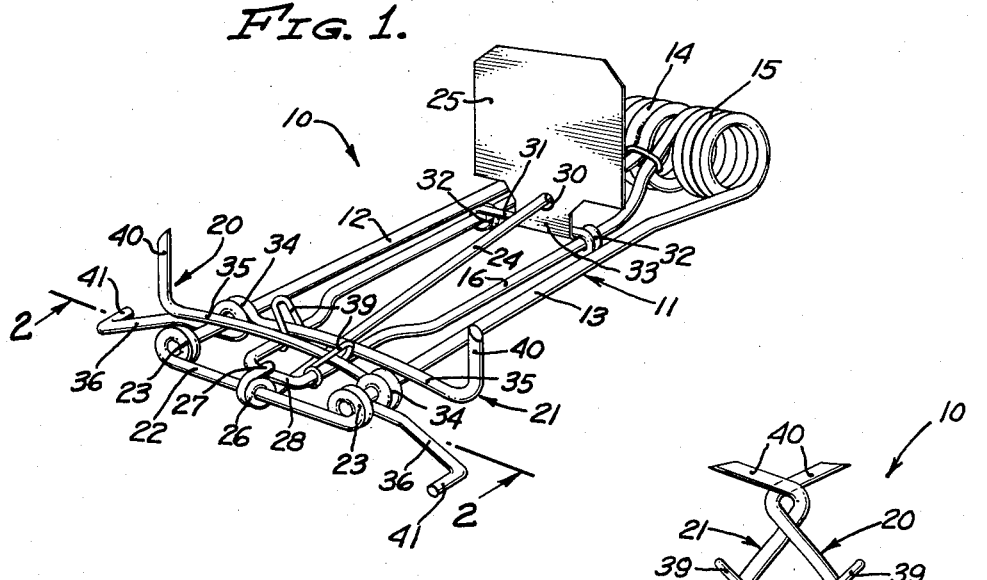
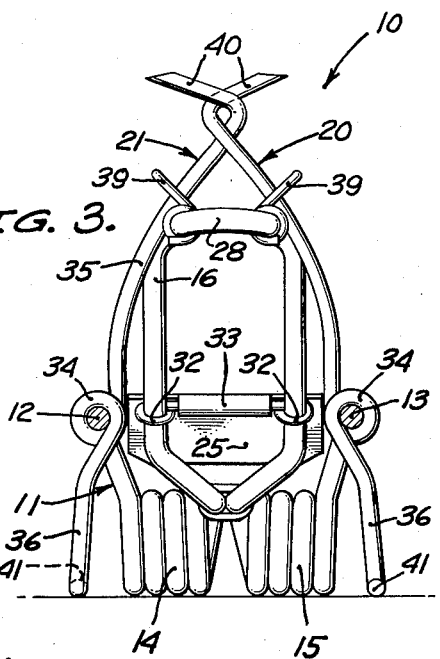
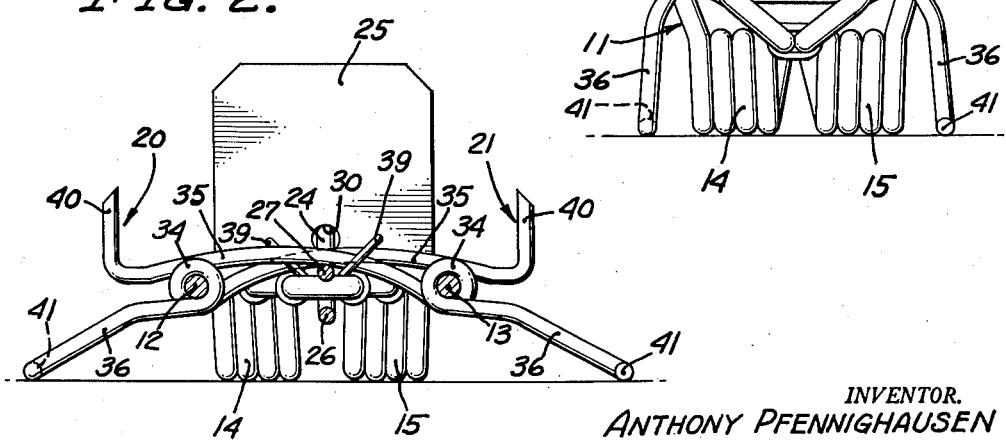
INVENTOR.
ANTHONY PFENNIGHAUSEN
BY
Herbert E. Kidder
AGENT

United States Patent Office
3,045,385
Patented July 24, 1962

3,045,385
GOPHER TRAP
Anthony Pfennighausen, 322 La Jolla, Morro Bay, Calif.
Filed Mar. 24, 1960, Ser. No. 17,416
1 Claim. (Cl. 43—90)

The present invention relates generally to animal traps, and more particularly to gopher traps, which are used in the burrows or runways tunneled through the ground by gophers.

The conventional gopher trap that has been in use for many years, comprises a spring steel wire construction which is placed in the runway next to a surface hole. The trap jaws are formed by steel wires which are pivoted for vertical swinging movement between open and closed positions, and the ends of the jaws are bent to form opposed prongs which impale the gopher between them. The jaws are held open by a trigger which is tripped by the gopher as he crawls over the trap. However, it has been found that many times the gopher either leaps or raises himself instinctively at the instant the trap is triggered, or else in crawling through the runway, has his body raised above the bottom of the runway a sufficient distance that the jaws of the trap spring closed beneath his belly and miss him altogether. The result is that a trap set in the runway will frequently be found sprung, with no gopher caught in its jaws.

The primary object of the present invention is to provide a gopher trap which is so constructed and arranged that in springing closed, it is caused to jump upwardly so that the gopher will be impaled between the jaws, no matter how high his body may be carried at the time.

Another object of the invention is to provide a trap which is capable of springing up into the air to catch the gopher, and yet which is no more expensive to manufacture than the conventional trap.

These objects are achieved by providing extension legs on the trap jaws, which rest on the ground when the jaws are open and swing downwardly as the jaws close, thereby causing the trap to spring up from the ground so as to impale the gopher at a height above the normal height of the prongs when the jaws are closed.

The foregoing, and other objects and advantages of the invention will become apparent to those skilled in the art upon consideration of the following detailed description of the preferred embodiment thereof, reference being had to the accompanying drawings, wherein:

FIGURE 1 is a perspective view of a gopher trap embodying the principles of the invention, the trap being shown in the "set" condition;

FIGURE 2 is a transverse sectional view of the same, taken at 2—2 in FIGURE 1; and FIGURE 3 is a view similar to FIGURE 2, showing the trap in the sprung condition.

In the drawings, the gopher trap of the present invention is designated in its entirety by the reference numeral 10, and is seen to comprise a base 11 formed of spring steel wire bent into a generally U-shaped configuration, with substantially parallel side arms 12 and 13, and having a pair of longitudinally spaced, axially aligned helical spring coils 14 and 15 in the bight portion thereof. The adjacent ends of the coils 14, 15 are joined to a loop 16, which extends forwardly therefrom and passes under a pair of opposed trap jaws 20 and 21. The outer ends of the side arms 12 and 13 are connected together by a cross wire 22, the ends of which are wrapped at 23 around the extremities of the side arms.

The loop 16 is urged upwardly with considerable force by tension of the spring coils 14, 15, and its outer end presses upwardly against the jaws 20, 21, urging the same toward the closed position shown in FIG. 3. The jaws are held open against the spring pressure of the loop 16 and spring coils 14, 15, by means of a trigger mechanism comprising a latch wire 24 and trigger plate 25.

The latch wire 24 has one end wrapped at 26 around the cross wire 22, and its extremity is formed by a short projection 27 which extends rearwardly toward the coils 14, 15. The tip end of the projection 27 is adapted to latch over the cross portion 28 of the loop 16, as shown in FIG. 1, so as to hold the end of the loop down and thereby hold the jaws 20, 21 open.

The latch wire 24 extends rearwardly from the coils 26 between the side arms 12, 13, and its tip end is adapted to latch into a hole 30 in the trigger plate 25. The trigger plate 25 is a generally square plate of sheet metal, which is pivotally supported on a cross wire 31 extended transversely between the sides of the loop 16. The ends of the cross wire 31 are wrapped tightly at 32 around the wire loop 16. Extending downwardly from the bottom edge of the trigger plate 25 is a tongue 33, which is wrapped loosely around the cross wire 31 so as to allow the trigger plate to swing freely on the cross wire.

The trap jaws 20 and 21 are each formed of spring steel wire bent to the configuration shown in the drawings. Each of the trap jaw wires is wrapped intermediate its ends around the associated side arm 12 or 13, to form coils 34 which serve as pivot bearings for the jaws; the coils 34 being loosely wrapped so that they are freely rotatable about the side arms.

The coils 34 are offset slightly to one side of center, so that there is a longer end 35 and a shorter end 36. The longer end 35 of each of the wires constitutes the trap jaw portion, and its extremity is bent to form a laterally projecting prong 40, which is sharpened to a point. The two prongs 40 project upwardly when the trap is set, as shown in FIG. 2, and the prongs come together from opposite sides, impaling the gopher between them when the trap is sprung, as shown in FIG. 3. Each of the longer ends 35 of the trap jaw wires passes through and is slidable within a wire guide loop 39 on the adjacent side of the spring loop 16. The guide loops 39 are formed of wire, and the ends thereof are wrapped around the wire of the loop 16. The guide loops 39 hold the trap jaws against the spring loop 16, and prevent the trap jaws from sliding lengthwise on the side arms 12, 13.

The shorter ends 36 of the trap jaw wires constitute extension legs which terminate in feet 41, bent at right angles to the leg. The feet 41 rest upon the ground when the trap is set, and as the prongs swing upwardly, the feet are swung downwardly. This causes the trap to spring up from the ground when the trigger is tripped, so that the gopher is caught between the prongs 40, even if his body is well above the level of the prongs when the jaws are closed. It has been found, for example, that on a smooth, hard surface, the trap will jump as high as nine inches, although the prongs 40 normally stand no higher than three inches above the surface of the ground when the trap is in the closed condition shown in FIG. 3. Since the gopher tunnel is rarely more than five or six inches in height, it is impossible for the gopher to escape the prongs, and the trap has been found to be almost 100% effective.

As best shown in FIGURE 1, the feet 41 are bent so that they extend in opposite directions from the legs 36. One important advantage of this arrangement is that if the gopher is not killed outright and attempts to crawl along tunnel, one or the other of the feet 41 will dig into the ground to hold the gopher back, regardless of which direction he attempts to crawl. Thus, it is not necessary to fasten the trap to a rope or chain, as it is virtually impossible for the gopher to drag the trap more than a few inches in either direction.

The operation and advantageous features of the present invention are believed to be clearly evident from the foregoing description and drawings. The trap is set in the gopher tunnel in the same manner as conventional traps, with the jaws and trigger plate projecting into the tunnel so that the gopher must crawl over the jaws before tripping the trigger plate 25. When the gopher runs into the trigger plate 25, the end of the latch wire 24 is disengaged from the hole 30, allowing the wire 24 to swing upwardly. As the wire 24 swings upwardly, the projection 27 releases the cross wire 22 of the spring loop 16, allowing the latter to swing upwardly. This forces the trap jaws 35 to swing up to the closed position, and simultaneously swings the extension legs 36 downwardly, so that the trap is caused to leap up from the ground and catch the gopher high up on the body.

While I have shown and described in detail what I believe to be the preferred form of my invention, it will be understood by those skilled in the art that various changes may be made in the shape and arrangement of the several parts without departing from the scope of the claim.

I claim:

An animal trap comprising a base adapted to lie substantially flat against the ground, a pair of opposed trap jaws adjacent one end of said base pivoted on said base for swinging movement transversely of said base between open and closed positions, spring means adjacent the other end of said base operable to close said jaws, means on said spring means to hold the trap jaws thereon, trigger means releasably engaging said spring means and operable to hold said jaws open against the pressure of said spring means until tripped by an animal, and extension legs on said trap jaws, said extension legs bearing against the ground when said jaws are in said open position, and said legs swinging downwardly as said jaws swing to said closed position, thereby causing said trap to spring upwardly into the air to catch the animal at a height above the normal height of the closed jaws, each of said extension legs having a foot at the outer extremity thereof, one of said feet being bent toward said one end of said base and the other foot being bent toward said other end thereof, whereby one of said feet will dig into the ground and anchor said trap against movement in the direction in which said foot is bent.

References Cited in the file of this patent
UNITED STATES PATENTS

| | | |
|---|---|---|
| 986,256 | Willis | Mar. 7, 1911 |
| 1,105,586 | Buck | July 28, 1914 |
| 1,205,388 | Pewther | Nov. 21, 1916 |
| 2,575,435 | Wilken | Nov. 20, 1951 |